United States Patent [19]
Boileau

[11] 3,904,463
[45] Sept. 9, 1975

[54] RADIAL TIRE WITH ADDITIONAL SIDEWALL REINFORCEMENT

[75] Inventor: Jacques Boileau, Clermont-Ferrand, France

[73] Assignee: Compagnie Generale des Etablissements Michelin, raison sociale Michelin & Cie, Clermont-Ferrand, France

[22] Filed: Nov. 14, 1973

[21] Appl. No.: 415,684

Related U.S. Application Data

[62] Division of Ser. No. 326,115, Jan. 23, 1973, Pat. No. 3,800,844.

[52] U.S. Cl. ............... 156/123; 152/354; 152/356; 152/362; 156/128; 156/132; 156/133
[51] Int. Cl... B29h 17/14; B29h 17/20; B29h 17/22
[58] Field of Search................... 152/354, 356, 362; 156/128, 123 A, 133

[56] References Cited
UNITED STATES PATENTS

| | | | |
|---|---|---|---|
| 3,044,522 | 7/1962 | Drakeford et al.............. | 152/362 R |
| 3,044,523 | 7/1962 | Drakeford et al.............. | 152/362 R |
| 3,253,636 | 5/1966 | Travers........................ | 152/362 R |
| 3,422,874 | 1/1969 | Weitzel........................ | 156/128 I |
| 3,455,100 | 7/1969 | Sidles et al. .................. | 156/128 I |
| 3,500,890 | 3/1970 | Boileau........................ | 152/354 |
| 3,557,860 | 1/1971 | Maiocchi...................... | 152/362 R |
| 3,722,567 | 3/1973 | Delobelle..................... | 152/354 R |
| 3,756,883 | 9/1973 | Gay............................ | 156/128 I |
| 3,765,468 | 10/1973 | Verdier....................... | 152/354 R |
| 3,776,293 | 12/1973 | Marzocchi..................... | 156/128 I |

*Primary Examiner*—Clifton B. Cosby
*Attorney, Agent, or Firm*—Brumbaugh, Graves, Donohue & Raymond

[57] ABSTRACT

A radial tire is formed with the usual radial carcass and, in each sidewall, an additional reinforcement ply comprising cords arranged circumferentially of the tire and having a stiffness which generally increases with increasing distance from the axis of the tire from a minimum value at the edge adjacent to the bead wire to a maximum value at the other edge. In manufacturing the tire on a building drum, the cords selected to form the additional ply comprise a fragile core portion and a portion wound in a helix around the core and capable of elongation by rupture of the core and increase of the pitch of the helix. During the subsequent shaping, the cords of the additional ply automatically acquire the proper stiffness. This produces a tire providing improved road qualities and passenger comfort.

2 Claims, 6 Drawing Figures

PATENTED SEP 9 1975　　3,904,463

RADIAL TIRE WITH ADDITIONAL SIDEWALL REINFORCEMENT

This is a divisional of U.S. application Ser. No. 326,115, filed Jan. 23, 1973, now U.S. Pat. No. 3,800,844.

BACKGROUND OF THE INVENTION

This invention relates to tires and, more particularly, to novel and highly-effective tires of the radial-carcass type.

A radial tire comprises very different types of reinforcements of the tread and the sidewalls. The tread is reinforced in such a manner that it is as non-deformable as possible and travels on the ground with a minimum of distortion and contraction in the lateral direction. These characteristics are due in large measure to plies of cords of preferably rigid material which are oriented substantially circumferentially. On the other hand, the sidewalls are made flexible by the use of cords which are arranged in radial planes of the tire and therefore do not intersect. This construction facilitates radial deformation of the sidewalls.

This basic scheme, as originally devised, has been subjected to certain corrections, since the flexibility of the sidewalls has certain disadvantages. In particular, it may give rise to instability at high speed, a fluttering of the rim with respect to the tread, and an excessively long time of response to the actions of the steering wheel. The corrections made to overcome these drawbacks have consisted in reinforcing the sidewalls, in particular between the midheight of the sidewall and the bead. Various solutions have been proposed. These solutions all have various drawbacks. Without speaking of the difficulties in manufacture which they entail, they all have the defect of causing comfort and road qualities to vary in opposite directions; if the sidewall is made more rigid, road qualities are improved, but passenger comfort suffers; if the sidewall is made less rigid, passenger comfort is improved, but road qualities suffer. This leads to making comfortable tires of limited speed capabilities and high-speed tires which are definitely less comfortable.

SUMMARY OF THE INVENTION

An object of the present invention is to remedy the problems of radial tires outlined above and, in particular, to provide a radial tire characterized by both a high degree of passenger comfort and superior road qualities. Another object of the invention is to provide a method of making the new tire.

The foregoing and other objects are attained in accordance with the invention by the provision of a radial-carcass tire having, in each sidewall, in addition to the usual carcass cords or cables, an additional reinforcement extending between the bead wires and the middle of the sidewall or beyond. The additional reinforcement comprises cords or cables arranged circumferentially and having a stiffness that increases, generally as a function of the distance from the axis of the tire, from a minimum value at the edge adjacent to the bead wires to a maximum value at the other edge.

The "stiffness" of a cord or cable is defined as the ratio $F/\Delta L/L$, in which F is a tensile force applied to the cord or cable and $\Delta L/L$ is the resulting relative elongation of the cord or cable.

The stiffnesses of the cords or cables at different distances from the bead wires must be compared for one and the same force F and under the very conditions in which they find themselves in the sidewall of the tire. In practice, one can, for instance, cut from the sidewall of the tire circumferential strips having the same width, for instance 1 cm, and each containing a number of cords; subject each strip to a force $nF$, $n$ being the number of cords in the strip and F being identical for all strips; and measure the elongation $\Delta L$ for a length L of the strip.

The reinforcement of the sidewalls in accordance with the invention has practically as much effectiveness with respect to the road qualities of the tire as a reinforcement of maximum, uniform stiffness. On the other hand, the variation in stiffness has a very favorable effect on passenger comfort, since it increases the radial flexibility and filters and damps the shock waves transmitted from the tread to the rim.

In order to produce a tire which has a reinforcement of stiffness which increases as a function of the distance from the axis in its sidewall, one proceeds as follows in accordance with the invention: Upon the building of the tire, the carcass ply or plies are wound in a conventional manner on a building drum and the bead wires put in position. Before the edges of the carcass ply or plies are bent around the bead wires, the reinforcement ply or plies are put in place, their cords being inclined at an angle between 0° and 5° to the circumferential direction. There is preferably used a ply in which the cords extend at an angle of 0°: i.e., in the circumferential direction. The ply is wound until overlap of its ends after having made one, and preferably several, turns. In order to permit the shaping of the carcass thus produced, the cords of the ply are wound helically around a fragile central core. During the shaping, the core breaks and the pitch of the helix increases gradually as a function of the elongation imposed until, for the radially outermost cord, all undulation disappears.

The tire is preferably characterized by a number of additional features:

a. The cords of the additional reinforcement are made of polyamide or another elastic material.

b. The cords are calendered in a rubber of a modulus of elasticity greater than or equal to 250 g/mm² at 100% elongation.

c. Between the carcass ply or plies on the one hand and the additional sidewall reinforcements on the other hand, there is interposed a layer of rubber the minimum thickness of which is at least equal to the diameter of the largest cords used in the carcass and reinforcement plies. This intermediate rubber has a modulus of elasticity less than that of the calendering rubber of the sidewall reinforcement cords.

d. The additional sidewall reinforcements extend at least over three-quarters of the height of the tire between the bead wires and the midpoint of the sidewall, that is to say, the point of the sidewall farthest from the median plane, and preferably over at least all this height.

BRIEF DESCRIPTION OF THE DRAWING

A better understanding of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
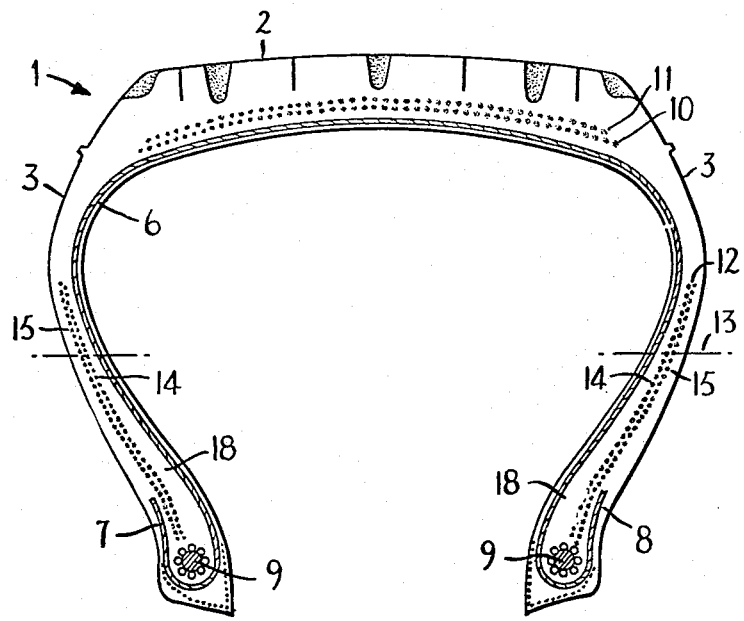
FIG. 1 is a view in radial section of a tire according to the invention.
Figure 2:
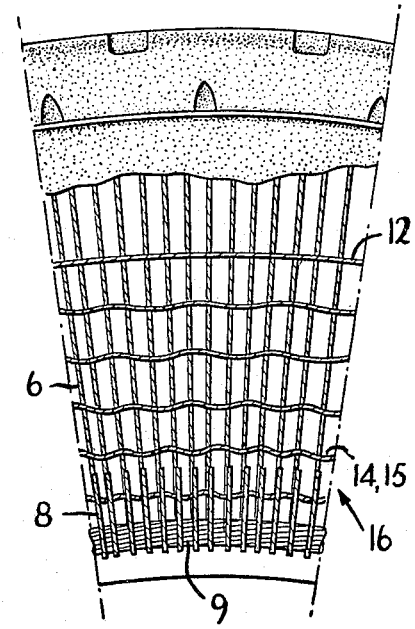
FIG. 2 is a view in elevation, partly broken away, of a sector of the sidewall of the same tire, the cords being shown farther apart than actually is the case for the sake of greater clarity.

FIG. 1 shows a tire 1 comprising a tread 2 and sidewalls 3. The reinforcement of the tire comprises a carcass ply 6 the ends 7 and 8 of which are wound around bead wires 9. As FIG. 1 and 2 show, the cords of the carcass ply 6 are arranged radially.

The tire reinforcement further comprises two tread plies 10 and 11 of steel cords between the carcass 6 and the tread 2. The reinforcement comprises also two plies 14 and 15 of cords in each sidewall 3 between each of the bead wires 9 and a point 12 located past the middle 13 of the sidewall. As shown in FIG. 2, the cords of the layers 14 and 15 are arranged parallel to the circumferential direction. Near the bead wires at 16 they have a slightly undulating appearance. On the other hand, on the other edge of the ply at 12 they are stretched.

The plies 14 and 15 are inserted, near the bead wires, between the carcass 6 and its folded-back portions 7 and 8, and they are separated from the carcass 6 by a relatively thick layer of rubber 18.

Figures 3, 4:
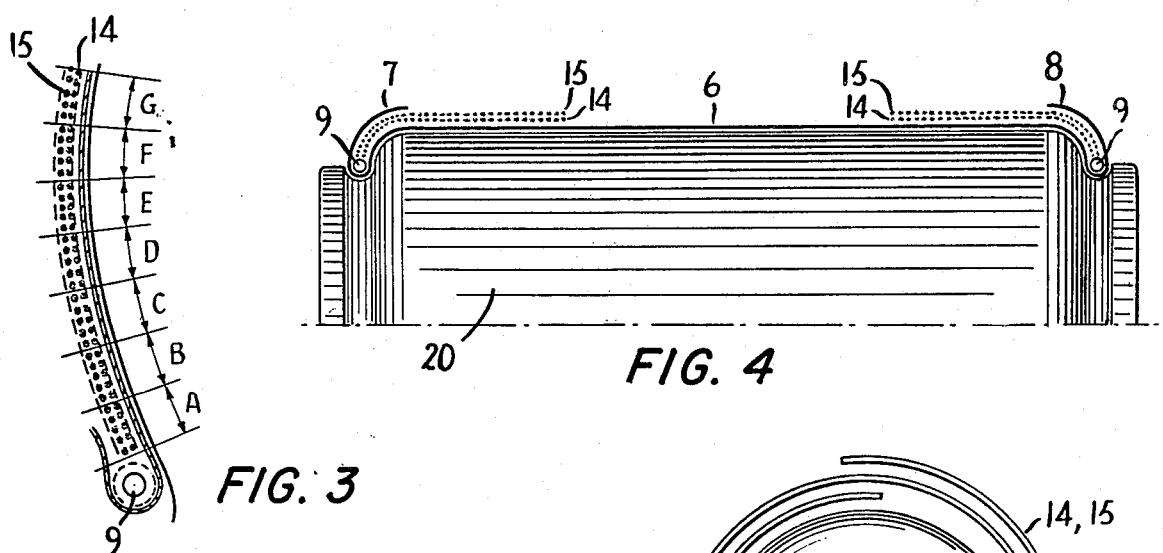
FIG. 3 is a view in radial section, on a larger scale, of a portion of the reinforcement of one of the sidewalls, showing the portion divided into strips of equal width.
FIG. 4 is a view in radial section of a carcass during the building thereof on a building drum.

FIG. 4 shows on the building drum 20 the carcass 6, the bead wires 9, the folded-back carcass portions 7 and 8, and the additional reinforcement plies 14 and 15, the cords of which are perpendicular to those of the carcass 6.

Figure 5:
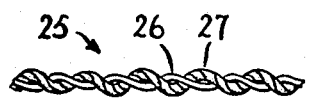
FIG. 5 is a view in elevation of a reinforcement cord employed in the additional sidewall reinforcement in accordance with the invention.

FIG. 5 shows a cord 25 of the type used for making the plies 14 and 15. This cord 25 comprises a core 26 of small diameter serving as support for the cord proper 27, which is wound helically around the core 26.

Figure 6:
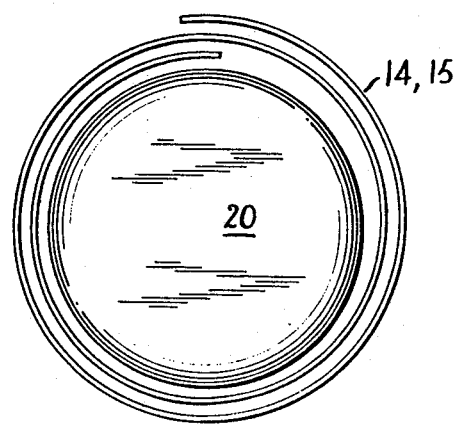
FIG. 6 is a very schematic end elevation of the cords of the additional plies in accordance with the invention arranged on a building drum.

As FIG. 6 shows in a schematic way, the additional reinforcement cords are wound around the building drum a plurality of times, and the ends overlap a short distance.

The numerical characteristics of the reinforcement of a tire of size 185–15 in accordance with the invention as follows:

1. Carcass (plies)
   Material: polyamide
   Denier of the cords: 1880 × 3
   Spacing: 0.85 mm
   Angle with respect to the circumferential direction: 90°
   Modulus of the calendering rubber: 390 g/mm² at 100% elongation 2. Tread Reinforcement (plies 10 and 11)
   Material: steel
   Type of cords: four strands of 0.23 mm; hoop of 0.12 mm
   Spacing: 0.85 mm
   Angles with respect to the circumferential direction: +24° and −24°

3. Reinforcement of the sidewalls (plies 14 and 15)
   Material: polyamide
   Denier of the cords: 940 × 3
   Core: polyvinyl-alcohol staple-fiber yarn measuring 16.934 km for 500 g of yarn
   Twist of the cord 27 around the core 26: 300 turns/meter
   Elongation without tension after rupture of the core: 19% to 26%
   Spacing: 1.6 mm
   Angle with respect to the circumferential direction: 0°
   Modulus of the calendering rubber: 390 g/mm² at 100% elongation
   Width: 7 cm 4. Interposed rubber (layer 18 of rubber)
   Modulus: 325 g/mm² at 100% elongation FIG. 3 shows how the plies 14 and 15 taken from a tire have been cut into strips A, B, C, D, E, F, G, each of a width of 1 cm, in order to measure their elastic properties.

The following table gives the results of these measurements:

| Strip | Elongation under 3 daN % | Elongation under 7 daN % | Elongation upon rupture % | Rupture force (daN) | Stiffness at 3 daN (daN) | Stiffness at 7 daN (daN) | Stiffness at rupture (daN) |
|---|---|---|---|---|---|---|---|
| A | 10.15 | 22.8 | 40.2 | 18.72 | 29.61 | 30.7 | 46.6 |
| B | 6.15 | 20.25 | 39.00 | 19.40 | 48.8 | 34.55 | 49.7 |
| C | 7.05 | 16.5 | 32.55 | 18.90 | 42.5 | 42.4 | 58.1 |
| D | 7.20 | 13.95 | 30.15 | 19.24 | 41.7 | 50.2 | 63.8 |
| E | 3.90 | 11.10 | 26.70 | 20.04 | 77 | 63.1 | 75.0 |
| F | 3.30 | 8.55 | 22.35 | 21.58 | 91 | 81.9 | 96.6 |
| G | 3.00 | 7.65 | 17.70 | 18.24 | 100 | 91.5 | 103 |

As can be seen, the sidewall reinforcement has a stiffness which is two to three times greater in the region G, which is most distant from the bead wires, than in the region A, which is closest to the bead wires. This heterogeneity is remarkable and confers great advantages, namely excellent comfort, in particular silent travel, excellent stability of the sidewalls, and direct and soft response to the movements of the steering wheel.

Many modifications of the preferred embodiments of the invention disclosed herein will readily occur to those skilled in the art upon consideration of this disclosure. Accordingly, the invention is to be construed as including all embodiments thereof within the scope of the appended claims.

I claim:

1. A method of manufacturing a radial-carcass tire, comprising the steps of laying bead wires and a carcass of cords on a cylindrical building drum, placing on the portions of the carcass intended to lie in the region of each sidewall of the tire extending from one of said bead wires to a point at least three-quarters of the way to the midpoint of the sidewall at least one ply of additional cords oriented perpendicularly to the cords of said carcass, said additional cords comprising a fragile core portion and a portion wound in a helix around the core and being capable of elongation by rupture of the core and increase of the pitch of the helix, and expanding the carcass to shape the tire, elongate the additional cords, break the core portions, and increase the pitch of the portions wound in a helix as a function of the elongation imposed.

2. A method according to claim 1 wherein each ply of additional cords is wound around the drum a plurality of times and wherein the ends of each ply overlap a short distance.

* * * * *

UNITED STATES PATENT AND TRADEMARK OFFICE
CERTIFICATE OF CORRECTION

PATENT NO. : 3,904,463
DATED : September 9, 1975
INVENTOR(S) : JACQUES BOILEAU

It is certified that error appears in the above—identified patent and that said Letters Patent are hereby corrected as shown below:

```
First Page, Item "[30] Foreign Application Priority Data
February 3, 1972      France................72.03718"
should be inserted.
```

Signed and Sealed this

Third Day of August 1976

[SEAL]

Attest:

RUTH C. MASON
Attesting Officer

C. MARSHALL DANN
Commissioner of Patents and Trademarks